United States Patent [19]

Stein

[11] 4,200,496

[45] Apr. 29, 1980

[54] VAPORIZER FOR GENERATING DEVELOPER GAS, CONTAINING AMMONIA GAS, FROM AQUEOUS AMMONIA FOR DEVELOPING DIAZO COPYING MATERIAL

[75] Inventor: Eckehard Stein, Frankfurt, Fed. Rep. of Germany

[73] Assignee: Hoechst Aktiengesellschaft, Fed. Rep. of Germany

[21] Appl. No.: 876,670

[22] Filed: Feb. 10, 1978

[30] Foreign Application Priority Data

Feb. 14, 1977 [DE] Fed. Rep. of Germany ... 7704348[U]

[51] Int. Cl.[2] .......................... B01D 3/26; G03D 7/00

[52] U.S. Cl. .................................... 202/153; 202/154; 202/155; 202/181; 202/205; 203/11; 203/12; 203/73; 203/86; 203/DIG. 14; 354/300

[58] Field of Search ............... 202/154, 153, 155, 163, 202/165-167, 181, 182, 158, 267, 205; 203/86, 91, 1, 12, 71, 73, DIG. 2, 10, 11; 354/300

[56] References Cited

U.S. PATENT DOCUMENTS

| | | | |
|---|---|---|---|
| 1,699,255 | 1/1929 | Seidler et al. | 202/154 |
| 2,146,721 | 2/1939 | Conviser | 202/154 |
| 2,281,906 | 5/1942 | Adams | 202/153 |
| 2,988,347 | 6/1961 | Molique | 202/154 |
| 3,151,042 | 9/1964 | Koshoot | 202/153 |
| 3,340,157 | 9/1967 | Weiss | 202/180 |
| 3,679,549 | 7/1972 | Newman et al. | 202/153 |
| 3,969,741 | 7/1976 | Frank | 354/300 |
| 4,003,069 | 1/1977 | Hilgers | 354/300 |

*Primary Examiner*—Wilbur L. Bascomb, Jr.
*Attorney, Agent, or Firm*—James E. Bryan

[57] ABSTRACT

This invention relates to a vaporizer for generating developer gas, containing ammonia, from aqueous ammonia for developing diazo copying material comprising a first vaporizer unit including a rectifying column and a column head, a gas outlet for taking off the developer gas and an inlet opening into the column head for feeding in aqueous ammonia, and a heatable, steam-generating sump vessel having a base and a residual water outlet, a second unit including a volatilizer with means for heating a base zone thereof, a residual water inlet opening in said base zone, a residual water line connecting said residual water inlet opening to said residual water outlet of said rectifying column, said residual water outlet of said rectifying column projecting upwardly in said sump vessel and having an orifice above the base thereof, said two units being arranged side by side with parallel axes in a single casing, a first connecting branch as said gas outlet for taking off the developer gas and a second connecting branch as the inlet for feeding in aqueous ammonia connected to said column head, a suction branch connected as a suction outlet on said volatilizer, said residual water outlet of said rectifying column, said first and second connecting branches of said vaporizer, said residual water inlet opening, and said suction branch of said volatilizer projecting from said casing, and said residual water connecting line having a section at a lower level than the base of the sump vessel and the base zone of the volatilizer.

6 Claims, 2 Drawing Figures

Figure 1:
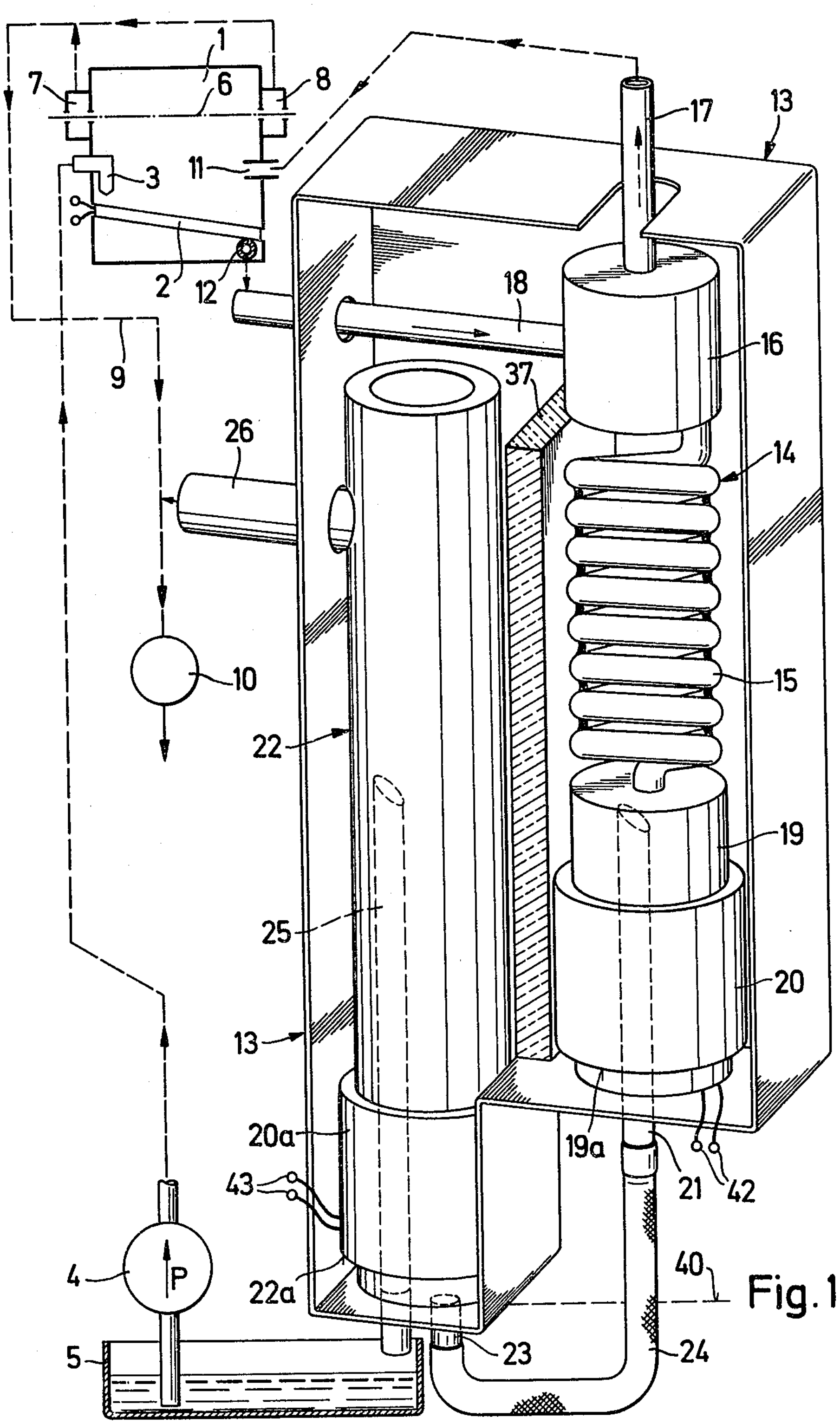

VAPORIZER FOR GENERATING DEVELOPER GAS, CONTAINING AMMONIA GAS, FROM AQUEOUS AMMONIA FOR DEVELOPING DIAZO COPYING MATERIAL

This invention relates to a vaporizer for generating developer gas, containing ammonia gas, from aqueous ammonia for developing diazo copying material.

A vaporizer of this type is provided in a copying apparatus, which does not produce effluent, for diazotype materials, as a vaporizer located outside a developing chamber (German Utility Model No. 73 14 454). The vaporizer is composed of a distillation boiler with a heater winding and a rectifying column which is packed with packing and has a column head. The distillation boiler is located at the foot of the rectifying column and serves as a sump vessel. The column head is connected to a feed line for aqueous ammonia solution. The aqueous ammonia solution fed in flows downwardly in the rectifying column countercurrently to a steam flow generated in the distillation boiler. Thus, mass transfer occurs between the countercurrent flows so that developer gas which contains ammonia gas and has a relatively high ammonia content can be taken off at the column head, while the residual water flowing into the distillation boiler virtually no longer contains any ammonia. The residual water collecting in the distillation boiler is fed via an outlet in the form of a siphon to the inlet of a volatilizer which also is heated. In the latter, the residual water is vaporized and discharged from the copying apparatus via a gas outlet, together with the waste air. In detail, the outlet of the residual water is fitted horizontally into the sump vessel. The siphon which forms the outlet and has a falling branch, a rising branch and again a falling branch, requires space in addition to the rectifying column and the volatilizer. The residual water line between the siphon and the volatilizer opens into an inlet horizontally fitted into the volatilizer. In copying apparatus for diazotype materials, this vaporizer, which includes a separate volatilizer, makes it possible to dispense with the otherwise customary residual water container, because the residual water obtained is converted in the vaporizer into the vapor phase or gas phase and is discharged to the atmosphere. In particular, this also applies when there are breakdowns in the operation of the rectifying column, for example a failure of the heating of the sump vessel. In this case, residual water with a high ammonia concentration reaches the vaporizer. The discharge of this residual water in conjunction with large amounts of waste air to the atmosphere is substantially less critical than the disposal of the residual water in the liquid phase. However, a general acceptance of such a vaporizer which is desirable for the above reasons is impeded by the fact that this causes significant additional expenditure, that it needs more space for mounting, that it cannot be simply installed afterwards without difficulty, and that, for example in the case of failure of the heating, it is unsafe in operation because of the danger of overflowing.

It is therefore the object of the present invention to provide a vaporizer for generating developer gas, containing ammonia gas, from aqueous ammonia and for disposing of the residual water collected in the liquid phase, which vaporizer is distinguished by a relatively small space requirement, high safety in operation and the fact that it readily can be installed even in the case of a subsequent exchange or a repair.

The space requirement for the entire vaporizer is kept small because the rectifying column and the volatilizer are accommodated as approximately cylindrical units side by side with parallel axes in a casing. For the same reason, the surface of the casing in which the two units are accommodated is relatively small so that even a thermal insulation which may be necessary is relatively inexpensive. The upper orifice of the residual water outlet branch determines the level which the residual water can assume in the sump vessel, and this is below the lowest point of the mass transfer section which is embodied in particular by a coiled pipe. This mounting of the residual water outlet branch is particularly advantageous for fabrication and assembly. Because the upper orifice of the residual water outlet branch is spaced from the base of the sump vessel, an outflow of the entire residual water from the sump vessel into the volatilizer and its vaporization in the latter are prevented. The residual water outlet branch on the sump vessel of the rectifying column is connected via the residual water line outside the casing to the residual water inlet branch of the volatilizer, at least a part of the residual water line being at a lower level than that of the bases of the sump vessel and the volatilizer. In this way, the residual water line in a very simple manner forms a gas-tight closure between the sump vessel and the residual water container. In the low-level part of the residual water line, residual water is always present and this blocks the sump vessel off against the volatilizer because this liquid cannot flow into the volatilizer. The complete vaporizer with the casing and the internal units very readily can be exchanged and is thus easy to service.

In a preferred embodiment of the vaporizer, the volatilizer is arranged in the casing in such a way that its base is at a lower level than the base of the vaporizer. For this reason, a relatively large amount of liquid can be stored in the volatilizer before it is completely vaporized, its level being limited by the upper orifice of the residual water outlet branch in the sump vessel because of the communicating link between the sump vessel and the volatilizer. This prevents flooding of the rectifying column by residual water and running out of condensate after a blue-printing machine, which is operated with a vaporizer of this type, has been switched off.

In the last-mentioned case, it is advantageous if the underside of the casing is stepped in accordance with the level difference between the base of the sump vessel and the base of the volatilizer. As a result, the residual water outlet branch projecting out of the sump vessel is conveniently accessible for connecting it to the residual water line even if this branch projects only for a short length out of the sump vessel. Furthermore, this provides a simple and reliable facility for fastening the rectifying column to the base of the casing.

In an advantageous manner, the vaporizer is designed so that an overflow branch projects upwardly in the volatilizer and has an orifice, spaced above the base and below the suction branch, at the same level as the orifice of the residual water outlet branch in the sump vessel. Appropriately, the overflow branch opens into a container for the aqueous ammonia, wherein mainly fresh aqueous ammonia is present which is fed to a vaporizer provided within the developing chamber or to the external vaporizer concerned here. This overflow branch, the orifice of which is at the same level as that of the residual water outlet branch, ensures in a simple manner the safety in operation of the vaporizer and/or of the entire blue-printing machine which is connected to a vaporizer of this type, even under extreme operating conditions. For example, if the heating of the volatilizer fails, flooding of the rectifying column or, if the heating of the volatilizer fails, overflowing of the volatilizer and hence destruction of machine components by corrosion are thus prevented.

For thermal insulation, the vaporizer which comprises two heated units advantageously has the feature that the casing is lined with asbestos foam on the inside. In this way, the energy requirement for operating the vaporizer is kept particularly low.

As a further advantageous measure, a partition wall of asbestos foam is provided in the casing between the vaporizer and the volatilizer. In this way, an undesirable temperature exchange between the rectifying column and the volatilizer is avoided; this would have a particularly troublesome effect on the mass transfer in the transfer section of the rectifying column which preferably is embodied by a coiled pipe. In this case, the transfer section is then only insignificantly affected by the heat released from the volatilizer.

In a particularly advantageous embodiment of the vaporizer, a first connecting branch as the gas outlet for taking off the developer gas and a second connecting branch as the inlet for feeding in aqueous ammonia are fitted to the column head, a residual water inlet branch is fitted as the residual water inlet and a suction branch is fitted as the suction outlet on the volatilizer, the residual water outlet branch, the first and second connecting branches of the vaporizer and also the residual water inlet branch and the outlet suction branch of the volatilizer project from the casing and connecting lines for heating the sump vessel and connecting lines for heating the volatilizer lead out of the casing. In this way it is possible conveniently to connect the complete vaporizer with the internal units to the copying apparatus, in particular a blue-printing machine, without opening the vaporizer. In detail, the connecting branch for taking off the developer gas from the column head should be connected to the developing chamber and the connecting branch which serves as the inlet for feeding in aqueous ammonia should be connected either to the developing chamber, in order to feed the aqueous ammonia consumed in this developing chamber, including condensate, to the external vaporizer, or, if no vaporizer is provided in the developing chamber, directly to a storage container for aqueous ammonia.

Figure 2:
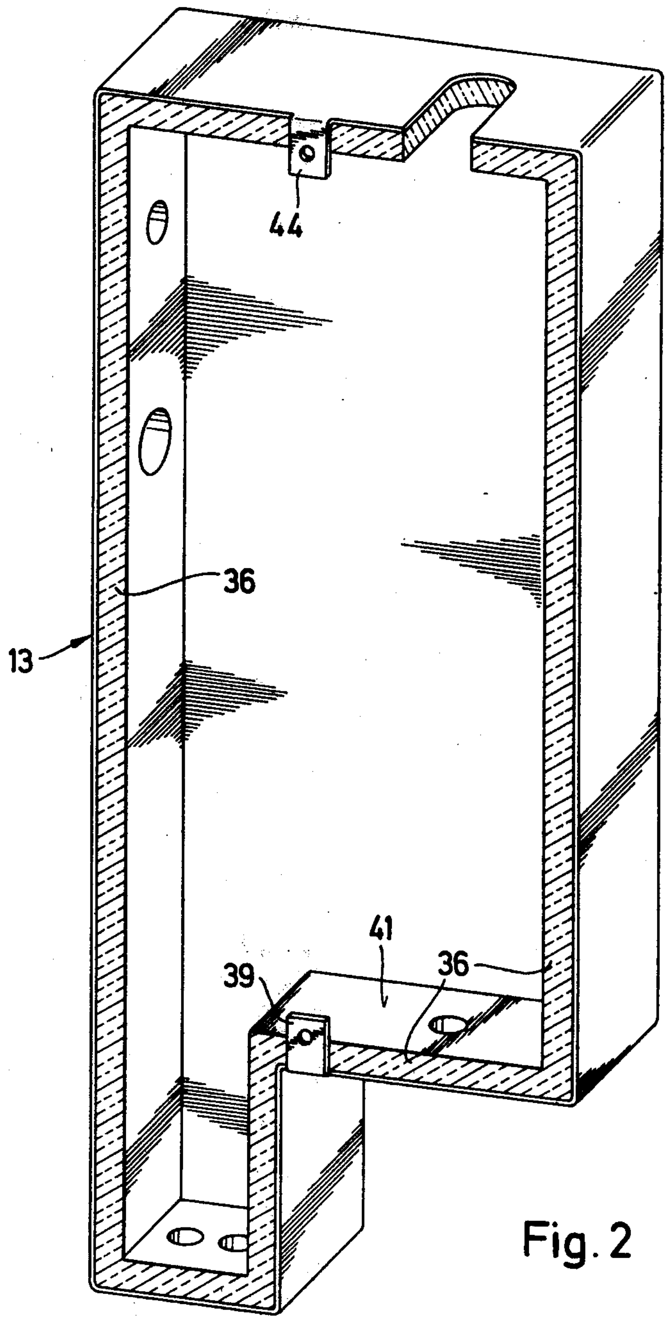

In the following text, the invention is further described by reference to the accompanying drawings with two figures in which:

FIG. 1 shows in a diagrammatic representation the vaporizer together with a volatilizer in a casing which is connected to a developing chamber shown schematically, and FIG. 2 shows the casing, lined with asbestos foam, the vaporizer and volatilizer having been removed.

In FIG. 1, numeral 1 designates a developing chamber in which a heated inclined chute 2 is provided as an internal vaporizer. Fresh aqueous ammonia which is pumped from an aqueous ammonia container 5 by means of a metering pump 4, is passed on to the chute via a feed branch 3. Largely fresh aqueous ammonia with about 25 percent ammonia by weight is present in the aqueous ammonia container. Antechambers 7 and 8, from which a mixture of developer gas and air, being formed therein, is extracted via an extraction line 9 by means of an extractor fan 10, are located on the outside of the developing chamber on the transport path, indicated by the dashed-and-dotted line 6, for the diazo copying material.

An inlet branch 11 for developer gas is fitted on the developing chamber, for feeding in additional developer gas from an external vaporizer. At the lower end of the internal vaporizer, the cross-section of a take-off pipe 12 can be seen which is provided for taking off the largely spent aqueous ammonia from the internal vaporizer and the condensate arising in the developing chamber. The take-off pipe is also connected to the external vaporizer.

The external vaporizer 14 is accommodated in a steel casing 13 which is provided with an asbestos foam lining 36 and the design of which can be seen in detail in FIG. 2. This shows in particular, that the underside of the casing is stepped, specifically in accordance with the level difference between the bases 19*a* and 22*a* of the sump vessel 19 and the volatilizer 22. On both the underside and the top, a lug 39, 44 with a tapped hole is fitted, it being possible to screw a front cover, which is not shown, onto these lugs for closing the casing.

The vaporizer 14 essentially comprises a rectifying column with a coiled pipe 15 as the transfer section. At the head of the transfer section, the column head 16 is located, of which a first connecting branch 17 for taking off the developer gas and a second connecting branch 18 for feeding in largely spent aqueous ammonia into the column head can be seen in FIG. 1. The first connecting branch 17 is connected to the inlet branch 11 for developer gas of the developing chamber and the second connecting branch 18 is connected to the take-off pipe of the developing chamber. At the foot of the transfer section there is a sump vessel 19 with a heater winding 20. The coiled pipe opens into this sump vessel. In the sump vessel, a residual water connecting branch 21 projects upwardly so that the level of the orifice of this connecting branch above the base of the sump vessel determines the filling level, as long as sufficient liquid flows out of the coiled pipe.

The external vaporizer 14 has an essentially cylindrical shape. Parallel to this external vaporizer, a volatilizer 22 which also has a cylindrical shape is located inside the casing. The vaporizer 14 and the volatilizer 22 are separated inside the casing by a partition wall of asbestos foam 37, for the purpose of thermal insulation.

At its base, the volatilizer has a residual water inlet branch 23 which is connected via a low-lying residual water hose 24 to the residual water outlet branch of the external vaporizer and thus forms, together with the sump vessel, a siphon. The residual water hose has, below the broken line 40, a section which lies lower than the bases 19*a*, 22*a*. It is preferably at least 80 cm long, the horizontal distance of the residual water outlet branch from the residual water inlet branch being 9 cm and the level difference between the bases 19*a* and 22*a* being 12 cm.

In the volatilizer, an overflow branch 25 projects upwardly, the lower orifice of which opens into the aqueous ammonia container 5. The extraction line 9 is connected to a suction branch 26 fitted into the wall of the volatilizer above the internal orifice of the overflow branch.

The aqueous ammonia streaming into the inlet branch 18 flows through the coiled pipe 15 countercurrently to a rising stream of water vapor which is generated in the sump vessel, and mass transfer takes place between the aqueous ammonia flowing down and the rising stream of water vapor, a mixture of ammonia gas and water vapor being liberated.

The residual water which leaves the foot of the coiled pipe 15 and which is virtually free from ammonia, normally is only partially vaporized in the sump vessel 19 to generate the rising stream of vapor necessary for mass transfer. The excess part of the residual water flows through the residual water connecting hose 24 into the volatilizer 22 and is completely evaporated therein. The virtually ammonia-free steam thus generated is extracted through the extraction line 9. If under certain operating conditions, for example after the external vaporizer and the volatilizer have been switched off, residual condensate or aqueous ammonia is still flowing into the second connecting branch of the external vaporizer 14, this is taken up by the relatively large capacity of the volatilizer. If, furthermore, even more condensate and/or aqueous ammonia flows into the external vaporizer, the excess part even then cannot pass into the extraction line because it flows off via the overflow branch 25 into the aqueous ammonia container. This operating condition, however, is extremely rare so that virtually no dilution of the aqueous ammonia in the aqueous ammonia container occurs.

Between the orifice of the overflow branch 25, located in the volatilizer, and the extraction branch 26, there is an interspace which serves as a buffer zone for rising bubbles which under certain circumstances are formed during the elimination of residual water. Because of the buffer zone, no bubbles or liquid portions can pass into the extraction line.

It will be obvious to those skilled in the art that many modifications may be made within the scope of the present invention without departing from the spirit thereof, and the invention includes all such modifications.

What is claimed is:

1. A vaporizer for generating developer gas, containing ammonia, from aqueous ammonia for developing diazo copying material comprising a first vaporizer unit including a rectifying column and a column head, a gas outlet for taking off the developer gas and an inlet opening into the column head for feeding in aqueous ammonia, and a heatable, steam-generating sump vessel having a base and a residual water outlet, a second unit including a volatilizer with means for heating a base zone thereof, a residual water inlet opening in said base zone, a residual water line connecting said residual water inlet opening to said residual water outlet of said rectifying column, said residual water outlet of said rectifying column projecting upwardly in said sump vessel and having an orifice above the base thereof, said two units being arranged side by side with parallel axes in a single casing, a first connecting branch as said gas outlet for taking off the developer gas and a second connecting branch as the inlet for feeding in aqueous ammonia connected to said column head, a suction branch connected as a suction outlet on said volatilizer, said residual water outlet of said rectifying column, said first and second connecting branches of said vaporizer, said residual water inlet opening, and said suction branch of said volatilizer projecting from said casing, and said residual water connecting line having a section at a lower level than the base of the sump vessel and the base zone of the volatilizer.

2. A vaporizer according to claim 1 in which said base zone of said volatilizer is at a lower level in said casing than the base of said sump vessel.

3. A vaporizer according to claim 2 in which the bottom of the casing is stepped in accordance with the level difference.

4. A vaporizer according to claim 1 including an overflow projecting upwardly in the volatilizer and having an orifice above said base zone, below said suction branch, and at the same level as the top of the residual water outlet of said rectifying column.

5. A vaporizer according to claim 1 including an asbestos foam lining in said casing.

6. A vaporizer according to claim 1 including a partition wall of asbestos foam in said casing between said vaporizer and said volatilizer.

* * * * *